US006640487B2

(12) United States Patent
Angwin (10) Patent No.: US 6,640,487 B2
(45) Date of Patent: Nov. 4, 2003

(54) FISHING APPARATUS AND METHOD OF USING SAME

(75) Inventor: John S. Angwin, 2310 W. Teton, Green River, WY (US) 82935

(73) Assignee: John S. Angwin, Green River, WY (US)

( * ) Notice: Subject to any disclaimer, the term of this patent is extended or adjusted under 35 U.S.C. 154(b) by 0 days.

(21) Appl. No.: 10/162,340

(22) Filed: Jun. 3, 2002

(65) Prior Publication Data

US 2003/0167676 A1 Sep. 11, 2003

Related U.S. Application Data

(60) Provisional application No. 60/362,966, filed on Mar. 11, 2002.

(51) Int. Cl.[7] .............................................. A01K 91/00
(52) U.S. Cl. ...................................................... 43/43.12
(58) Field of Search .......................... 43/42.06, 44.99, 43/43.12, 42.12

(56) References Cited

U.S. PATENT DOCUMENTS

| | | | | | |
|---|---|---|---|---|---|
| 2,659,176 A | * | 11/1953 | Wenger | ...................... | 43/42.31 |
| 2,791,058 A | * | 5/1957 | Bettini | ...................... | 43/42.06 |
| 2,922,246 A | * | 1/1960 | Mileschuk | ................. | 43/42.06 |
| 3,654,724 A | * | 4/1972 | Charron | ...................... | 43/42.06 |
| 4,267,658 A | * | 5/1981 | Brown et al. | .............. | 43/42.06 |
| 4,602,453 A | * | 7/1986 | Polley | ....................... | 43/44.99 |
| 4,736,542 A | * | 4/1988 | Floyd | ....................... | 43/42.06 |
| 4,763,434 A | | 8/1988 | Horneff | | |
| 4,799,328 A | * | 1/1989 | Goldman | .................... | 43/42.06 |
| 4,888,907 A | * | 12/1989 | Gibbs | ........................ | 43/42.06 |
| 4,930,245 A | * | 6/1990 | Bazzano | ..................... | 43/42.17 |
| 4,964,235 A | * | 10/1990 | Gruelle | ...................... | 43/42.06 |
| 5,018,296 A | | 5/1991 | Putz, II | | |
| 5,155,947 A | * | 10/1992 | Rivard | ....................... | 43/42.06 |
| 5,170,579 A | | 12/1992 | Hollinger | | |
| 5,172,510 A | * | 12/1992 | Lovell, Jr. | ................. | 43/42.36 |
| 5,321,906 A | * | 6/1994 | Bommarito | ................ | 43/44.99 |
| 5,412,897 A | | 5/1995 | Smith | | |
| 5,595,015 A | | 1/1997 | Jensen | | |
| 5,678,349 A | | 10/1997 | Pacora | | |
| 5,906,298 A | * | 5/1999 | Ward | .......................... | 222/175 |
| 6,141,900 A | | 11/2000 | Rudolph | | |
| 6,393,756 B1 | * | 5/2002 | Forney et al. | ............. | 43/42.06 |

* cited by examiner

*Primary Examiner*—Charles T. Jordan
*Assistant Examiner*—Jordan Lofdahl
(74) *Attorney, Agent, or Firm*—TraskBritt (57) ABSTRACT

A scent releasing fishing apparatus such as a downrigger weight. The apparatus includes a body having a cavity formed therein providing a reservoir to hold an amount of scented attractant in liquid form. A nozzle may be removably coupled with the body and in communication with the cavity for releasing the liquid material contained therein. A wicking member may be partially disposed in the cavity and extend through the nozzle orifice such that it is partially externally located relative to the body of the apparatus. The wicking member is formed of an absorbent material and assists in delivering the liquid material through the nozzle through a wicking or capillary action. The apparatus may be formed of a dense material such as lead for easy submersion in a body of water.

20 Claims, 6 Drawing Sheets

FISHING APPARATUS AND METHOD OF USING SAME

CROSS-REFERENCE TO RELATED APPLICATIONS

This application claims the benefit of United States Provisional Patent Application Serial No. 60/362,966, filed Mar. 11, 2002 entitled Trailblazer Downrigger Weight.

BACKGROUND OF THE INVENTION

1. Field of the Invention

The present invention relates generally to an apparatus used in conjunction with fishing and, more specifically, to an apparatus capable of releasing a scent during fishing as well as its method of use.

2. State of the Art

Numerous devices and techniques have been developed in an attempt to improve the fishing experience for the recreational and sporting fisherman. Many of such improvements are related to the ability to attract the fish to the fisherman's line including, for example, improvements to lures, bait and other attractants as well as improvements regarding the introduction or presentation thereof.

One type of attractant which has been used in fishing with some success includes scent-releasing devices. Such devices are configured to provide a scent within the water to attract the fish to the fisherman's line and, desirably, increase the attraction of the bait or lure being used by the fisherman. For example, U.S. Pat. No. 5,595,015 issued Jan. 21, 1997 to Jensen, discloses a fishing lure having a cavity formed therein to store or house an amount of scented bait. The cavity is open to the water such that, when submerged and towed through the water, the surrounding water gradually washes the bait out of the cavity.

U.S. Pat. No. 5,018,296 issued May 28, 1991 to Putz, II, discloses another scent releasing device which may be utilized during trolling. The device includes a plate-like hydrofoil member which is configured for attachment to the towing or downrigger line of a boat. The hydrofoil includes a plurality of "pods" or generally cylindrical members along the lower end thereof. One or more of the pods may include a cavity formed therein for holding a scented material. A small orifice is formed in the exterior wall of the pods for release of the scented material from the cavity while the device is being towed through the water.

U.S. Pat. No. 5,412,897 issued May 9, 1995 to Smith, shows another scent releasing device which may be used in association with trolling. The device includes a casing having a plurality of cavities or compartments formed therein. One of the cavities is configured to hold fish bait or some other scented attractant material therein. Another of the cavities is configured to hold a weighted member therein. Inlet and outlet ports are in communication with the cavity containing the fish attractant such that, when towed through the water, water enters into the inlet port and washes out some of the fish attractant through the outlet port.

While such devices have generally allowed the sportsman or recreational fisherman to utilize scented attractants in association with other more conventional physical attractants, such devices do not allow the user to choose or control the rate at which the scented attractant may be released or discharged. Additionally, the discharge of scented attractants from such conventional devices relies heavily on the rate at which such devices are towed through the water. Such devices are further limited in what type of attractants may be used therewith, as some attractants which may exhibit a lower viscosity may not be appropriately dispensed from the devices having an orifice which is fixed in size and geometry.

In view of the shortcomings in the art, it would be advantageous to provide a fishing apparatus which allowed for the release of a scented attractant which allowed for more efficient discharge of such attractant. Further, it would be advantageous to provide a fishing apparatus which allowed for variability in the rate of discharge of such scented attractant. It would be additionally desirable to provide a simple means of controlling the variable rate of discharge such that a user may be able to quickly and easily change the rate of discharge without undue interruption of the fishing experience.

BRIEF SUMMARY OF THE INVENTION

In accordance with one aspect of the invention a fishing apparatus is provided. The apparatus includes a body defining a cavity therein. A first opening is formed in an exterior surface of the body and is in communication with the cavity. The cavity provides a reservoir for a liquid material such as, for example, a fish attractant. A nozzle is removably coupled with the first opening and is configured to convey a liquid material therethrough. A second opening may also be formed in the exterior surface of the body and in communication with the cavity. A stopping member, such as a cap or a plug, may be provided and removably and sealingly coupled with the second opening. The second opening may serve as an opening for filling the cavity with the liquid material. One or more fastening members may be coupled with the body to facilitate operative coupling with, for example, a towing line and/or a fishing line.

In accordance with another aspect of the invention another fishing apparatus is provided. The apparatus includes a body defining a cavity therein for holding an amount of liquid material. A first opening is formed in an exterior surface of the body and is in communication with the cavity. A wicking member is partially disposed within the cavity and extends through the first opening such that it is partially externally located relative to the body. The wicking member is desirably formed of an absorbent material such as, for example, cotton, an serves to facilitate dispensing of the liquid material from the cavity through a wicking or capillary action.

In accordance with another aspect of the present invention a downrigger weight is provided. The downrigger weight includes a body defining a cavity therein providing a reservoir for holding an amount of liquid material. A first opening is formed in an exterior surface of the body and is in communication with the cavity. A nozzle is removably coupled with the first opening and configured to convey a liquid material therethrough. A wicking member is partially disposed in the cavity and extends through the nozzle such that it is partially disposed externally to the body of the downrigger weight. A second opening is formed in the exterior surface of the body and is in communication with the cavity. A stopping member is removably and sealingly coupled with the second opening. A plurality of fastening members are coupled with the body and are configured to facilitate attachment of the downrigger weight to a towing or downrigger line as well as to a fishing line.

In accordance with another aspect of the invention, a kit for a fishing apparatus including interchangeable nozzles for releasing a liquid material at a predetermined rate from the fishing apparatus. The kit includes a plurality of nozzles configured to be coupling with a cavity defining a reservoir in the body of the fishing apparatus. The plurality of nozzles each include at least two nozzles exhibiting different size orifices formed therein. Thus, the rate of discharge of the liquid material may be established through the selection of a nozzle having a specific orifice size.

In accordance with another aspect of the present invention, a method of using a scent releasing fishing apparatus is provided. The method includes providing a quantity of liquid material including scented attractant in a reservoir of the apparatus. The apparatus is then disposed within a body of water and the liquid material is dispensed through an orifice of a nozzle at a first rate of discharge. The nozzle of the apparatus is then reconfigured and the apparatus is again disposed in the body of water with the liquid material being dispensed at a second, different rate of discharge.

In accordance with yet another aspect of the present invention, another method of using a scent releasing fishing apparatus is provided. The method includes providing a quantity of liquid material including scented attractant in a reservoir of the apparatus. The apparatus is then disposed within a body of water and the liquid material is dispensed through an orifice of a nozzle via a capillary or wicking action. For example, a wicking member such as a cotton wick may be partially disposed within the reservoir of liquid material and extend through the orifice of the nozzle to effect such a capillary or wicking action.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 1:
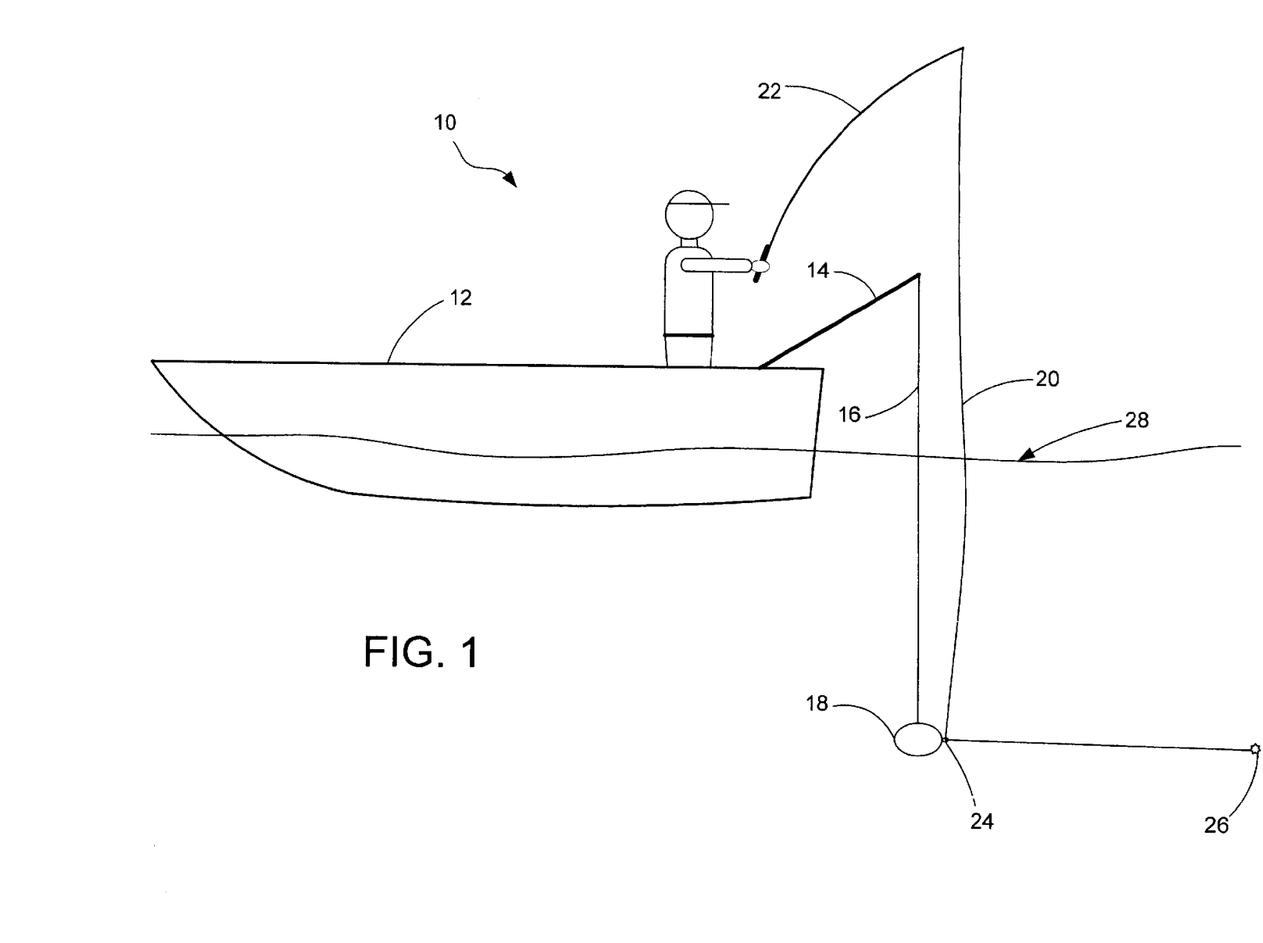
FIG. 1 shows a fishing rig according to an embodiment of the present invention.

Referring to FIG. 1, a system or rig 10 is shown including a vessel 12 such as, for example, a boat suitable for trolling. A structural member 14, which may be configured as, for example, a strut, is attached to the rear of the vessel 12 and is used to suspend a towing or downrigger line 16 from the vessel. At the distal end of the downrigger line 16 is an apparatus 18 used for depth control, also referred to herein as a downrigger weight. The fishing line 20 extending from a trolling-type apparatus or from a conventional fishing rod 22, is coupled to the downrigger weight 18 via a releasing mechanism 24 as will be appreciated by those of ordinary skill in the art. A physical attractant 26, such as, for example, a lure or bait with an appropriately configured fishing hook, is attached to the end of the fishing line 20 as will also be appreciated by those of ordinary skill in the art.

The downrigger weight 18 is used to set the attractant 26 at a specified depth as determined by the fisherman. For example, if it is determined, such as with the use of a locating device conventionally known in the art, that fish are located at approximately 15 feet below the water's surface 28, then the fisherman may set the downrigger line 16 such that the downrigger weight 18 is approximately fifteen (15) feet below the water's surface 28. The depth of the downrigger weight 18 then maintains the depth of the attractant 26 at the desired level. Upon the capture of a fish, the fish will pull on the fishing line 20, actuating the releasing mechanism 24, and thereby releasing the fishing line 20 from the downrigger weight 18 and allowing the fisherman to reel in the fish in a conventional manner.

Figure 2A:
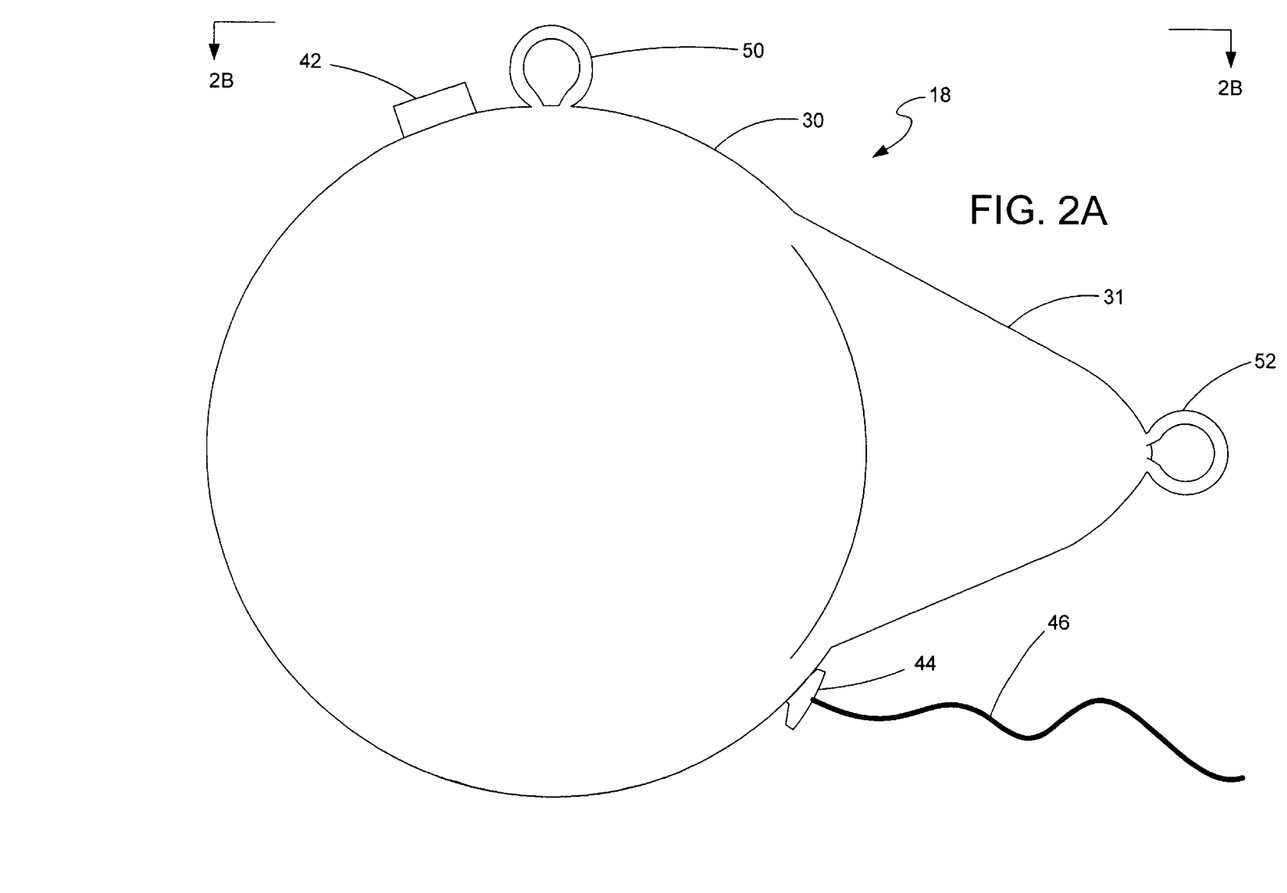
FIGS. 2A through 2C show elevational, plan and partial sectional views, respectively, of a downrigger apparatus according to an embodiment of the present invention.
Figure 2B:
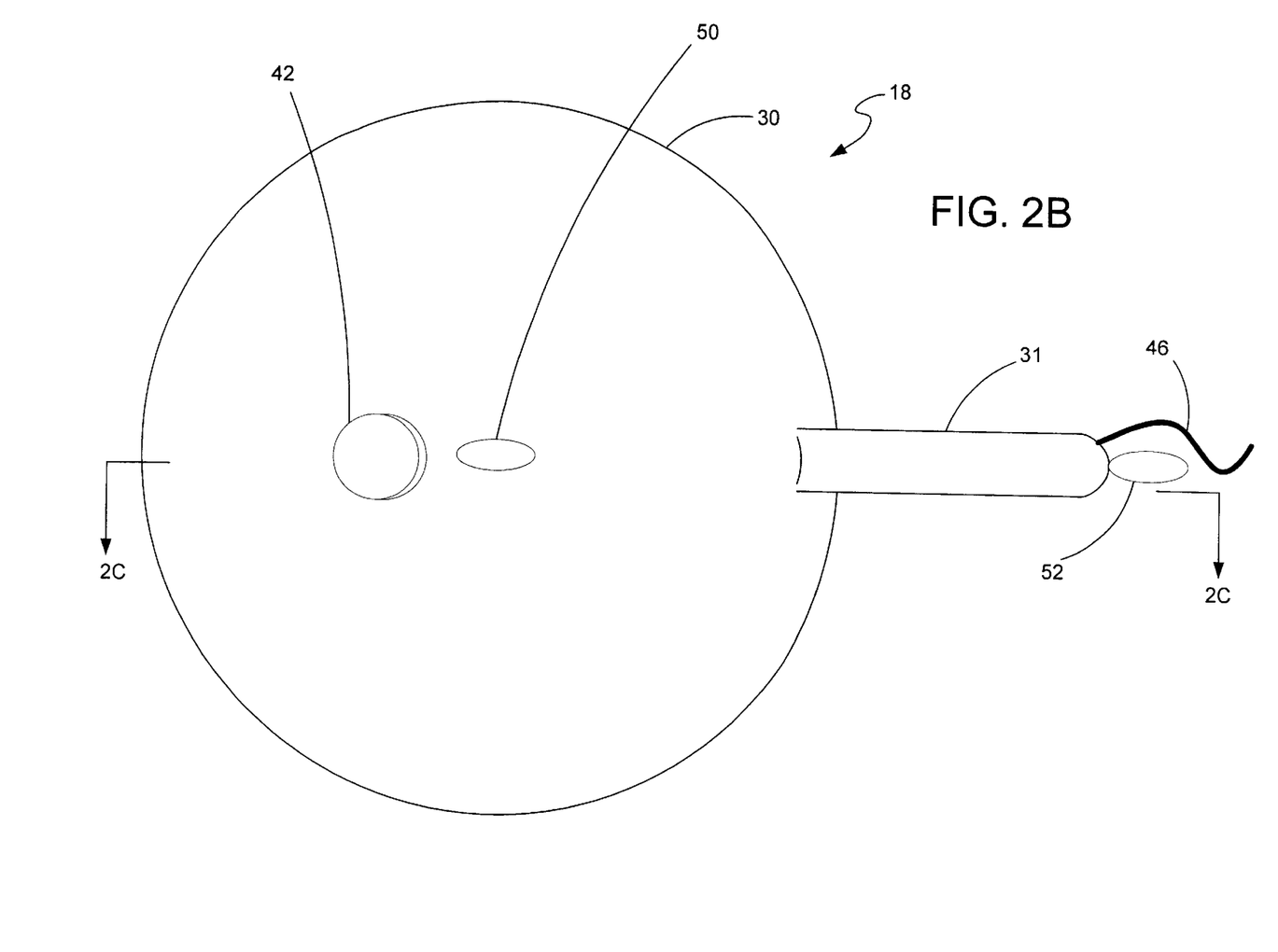
Figure 2C:
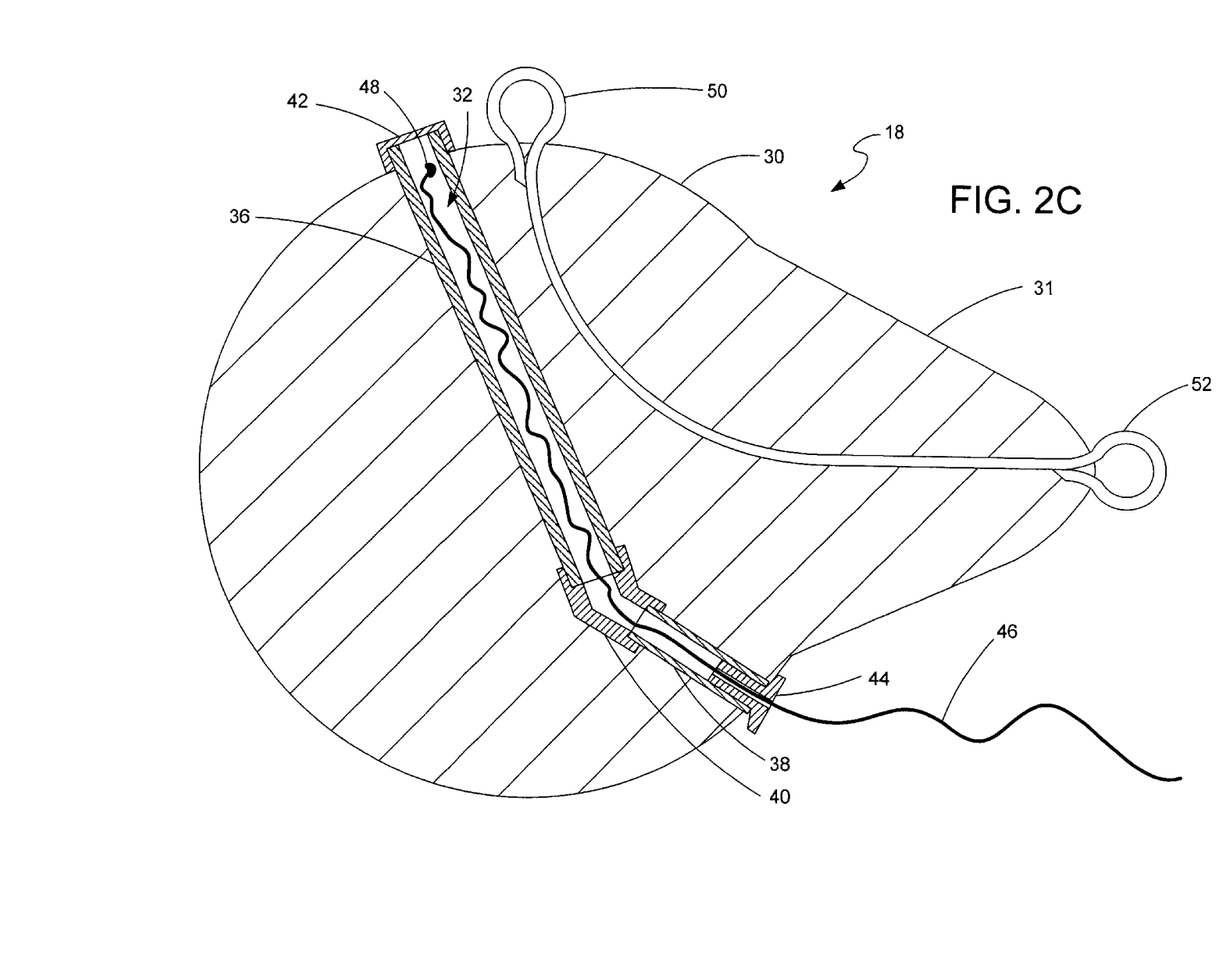

Referring now to FIGS. 2A through 2C, a downrigger weight 18 according to one embodiment of the present invention is shown and described. The downrigger weight 18 includes a body 30 including a portion which may be substantially spherically shaped and a rudder member or fin 31. As will be appreciated by those of ordinary skill in the art, the fin 31 helps to prevent the downrigger weight 18 from spinning during towing or trolling activities which spinning would result in the tangling of the downrigger line 16 and the fishing line 20 (FIG. 1).

The body 30 is desirably configured and formed of a material having a substantially higher relative specific weight than water (or sea water) such that the downrigger weight 18 does not float, but rather becomes submerged in the body of water in which it is placed. For example, the body 30 may be formed of material such as lead. The downrigger weight 18 may be configured to exhibit various weights and/or sizes. For example, depending on various factors, including the depth at which a fisherman desires to place the downrigger weight 18, it is contemplated that an exemplary downrigger weight 18 may weigh approximately eight (8) to ten (10) pounds.

Additionally, it may be desirable for purposes of physical appearance and/or for purposes of material protection (e.g., corrosion prevention) to coat the material of downrigger weight 18 with another appropriate material. For example, the body may be painted or coated with a material such that the downrigger weight 18 does not unduly distract the fish from the physical attractant 26 at the end of the fishing line 20 (FIG. 1). Also, depending on the material used to form the body 30, such a coating may serve as a corrosion inhibitor to improve the useful life of the downrigger weight 18.

A is cavity 32 formed within the body 30 and may be fashioned by various means including placing a core in the body 30 during a casting process or by machining of the cavity 32 after the body 30 has been formed as a solid member. However, as shown in FIG. 2C, a preformed cavity may be molded in situ by placing an appropriate conduit or conduit assembly into the mold. For example the cavity 32 may include a first length of steel pipe 36, a second length of steel pipe 38 and a pipe fitting 40, such as an elbow fitting, coupling the first and second lengths of pipe 36 and 38 together. The first and second lengths of pipe 36 and 38 need not be the same diameter pipe. For example, the first pipe 36 may be formed of ¾ inch diameter pipe while the second pipe 38 may be formed of ¼ inch diameter pipe. In such a case, the pipe fitting 40 may be a reducing type fitting for proper coupling of the two pipes 36 and 38. It is noted that the use of standard pipe and pipe fittings allows for the efficient manufacture of the downrigger weight 18 since the cavity 32 may be constructed using national pipe thread (NPT) components and fittings which are readily available, relatively inexpensive and easily assembled.

A removable stopping member 42, such as a cap or a plug, is located at an upper end of the cavity 32 and is sealingly coupled therewith such as by threaded coupling with the first length of pipe 36. A discharge nozzle 44 having an orifice therethrough is located at a lower end of the cavity 32 and may be removably coupled therewith, such as by threaded coupling with the second length of pipe 38. A wicking member 46 formed of an absorbent material such as, for example, cotton, is partially disposed within the cavity 32 and coupled to a retaining device 48 therein. The wicking member 46 extends through the orifice of the discharge nozzle 44 such that a portion of the wicking member 44 is externally located with respect to the cavity 32 of the downrigger weight 18.

The discharge nozzle 44 may be removable and interchangeable such that different sized orifices may be used with the downrigger weight for different discharge rates of a liquid material placed in the cavity 32 as discussed in greater detail below. While different types of nozzles may be used for discharging a liquid material from the cavity 32, one exemplary nozzle 44 includes a carburetor jet such as a 70H jet size with a ¼ inch fine thread coupling. Such a jet is commercially available from Gary Williams' Carburetor located in Pearl, Miss.

It is noted that alternative nozzles or nozzle assemblies are contemplated as being utilized with the present invention. For example, a nozzle assembly may be used wherein a nozzle housing is fixedly coupled with the cavity 32 of the body 30 and configured for receipt of one of a plurality of interchangeable nozzle bodies. The nozzle body, upon disposal in the housing, may be oriented at a desired angle of discharge and then held within the nozzle housing by a retaining member. The nozzle body may thus be easily removed and replaced with one having a different sized orifice as is desired.

Alternatively, while more complex and costly, a nozzle having the capacity of varying the flow rate of liquid through an orifice thereof may be utilized. Such an adjustable nozzle offers the convenience of not requiring additional parts (e.g., nozzles or nozzle bodies) in order to vary the flow of liquid material from the downrigger weight 18.

A pair of fastening members 50 and 52, shown as eye hooks, are coupled with the body 30. One fastening member 50 may be positioned and configured to be coupled with the downrigger line 16 and the other fastening member 52 may be positioned and configured to be coupled with the fishing line 20 via a releasing mechanism 24 (see FIG. 1). The fastening members may be individual members or, as shown, may be formed of a single member extending through a portion of the body 30. For example, the fastening members 50 and 52 may be formed as loops at opposing ends of a length of 11 gauge wire.

In use, a liquid material comprising a scented attractant may be placed in the cavity 32 by removing the stopping member 42 and dispensing the liquid material therein. The cap 42 is then replaced to keep the liquid material from being discharged through the upper opening of the cavity 32. The wicking member 46 absorbs a quantity of the liquid material and, through a wicking or capillary action, assists in efficiently discharging the liquid material through the discharge nozzle 44.

It is noted that the scent releasing mechanism of the present invention does not utilize a forward and rearward set of orifices or openings as are required for the washing away of scented attractant in other conventional scent releasing mechanisms.

Figure 3A:
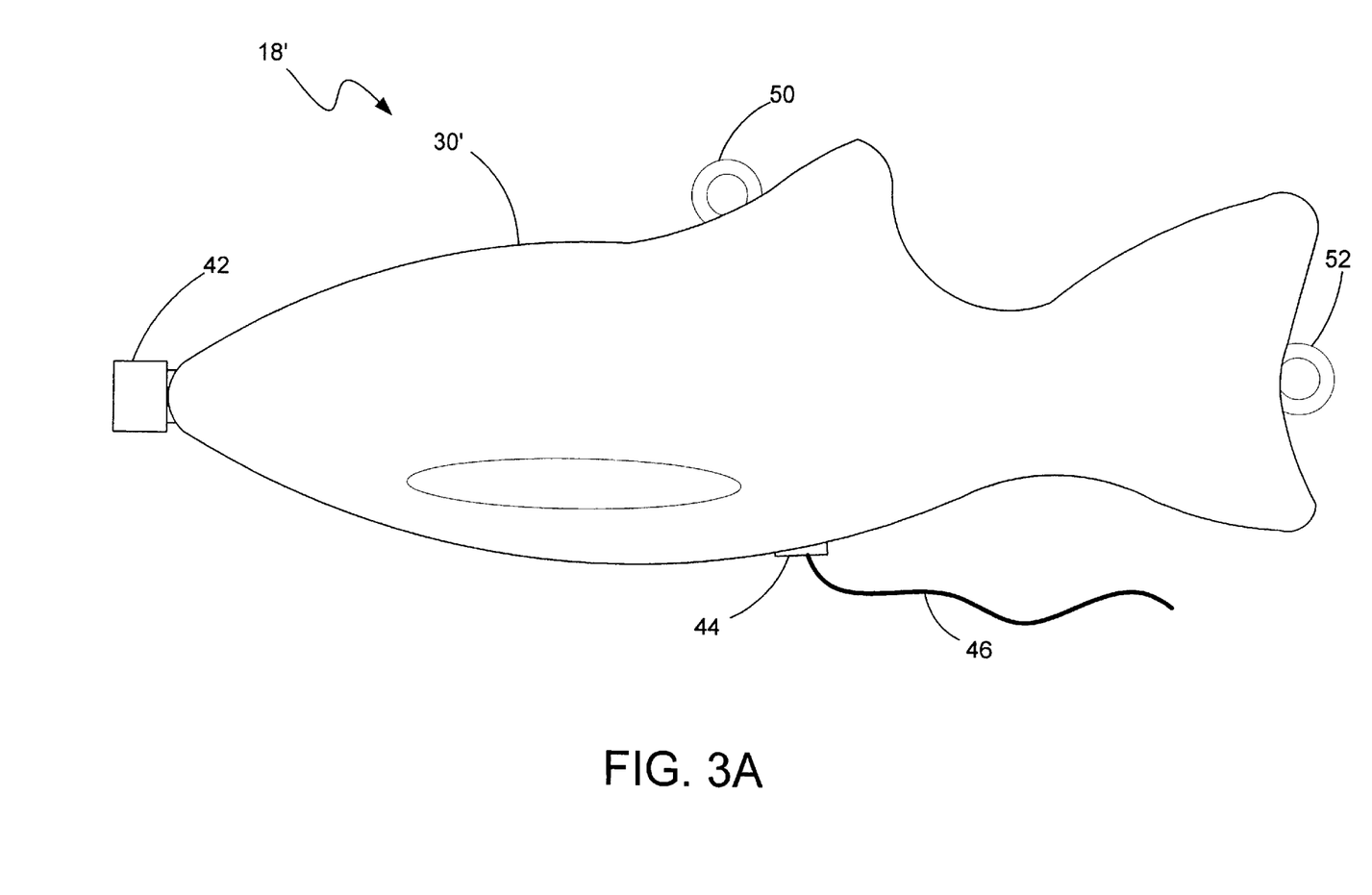
FIGS. 3A and 3B show elevational and partial sectional views, respectively, of a downrigger apparatus according to another embodiment of the present invention.
Figure 3B:
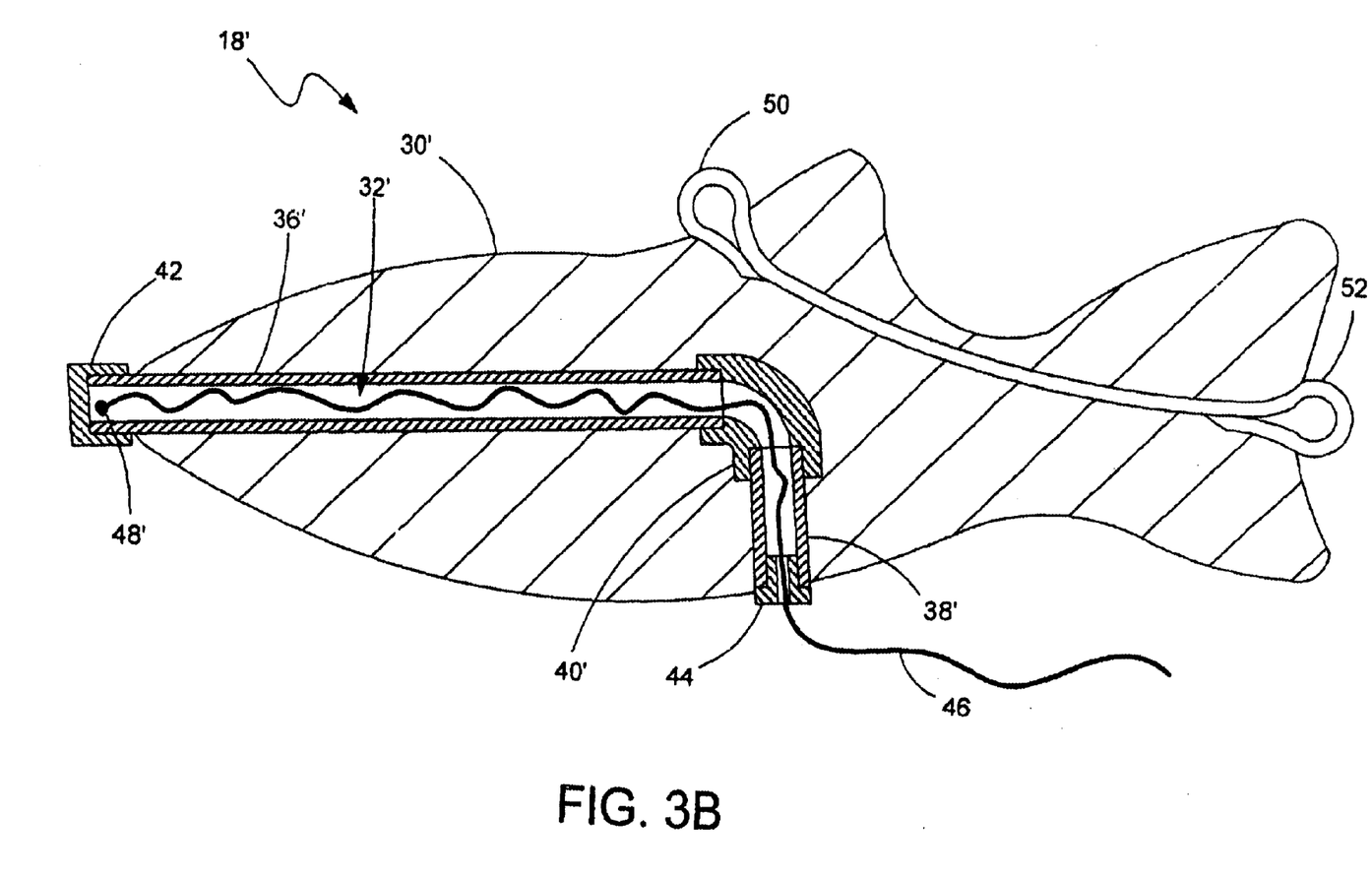

Referring now to FIGS. 3A and 3B, a downrigger apparatus 18' is shown according to another embodiment of the present invention. The downrigger apparatus 18' includes a body 30' which is configured to physically resemble a fish or other marine life. A cavity 32' is formed within the body 30' such as with a plurality of pipes 36' and 38' and appropriate fittings 40'.

As with the above-described embodiment, the stopping member 42 is removably coupled with the cavity 32' to facilitate disposal of a liquid material into the cavity 32'. The discharge nozzle 44 is coupled to the cavity 32' for controlled dispensing of the liquid material therefrom. The wicking member 46 is coupled to a retaining device 48 within the cavity 32' and extends through the discharge nozzle 44 with a length thereof being external to the cavity 32' of the downrigger weight 18'. Fastening members 50 and 52 are coupled with the body 30' and may be configured for attachment to a downrigger line 16 and fishing line 20 respectively (see FIG. 1).

It is noted that the cavity 32' is oriented differently than that of the embodiment shown and described with respect to FIG. 2B. In particular, a substantial portion of the cavity 32' is configured and oriented as a substantially horizontal conduit (i.e., pipe 36') and is actually slightly elevated at the end which is coupled with the fitting 40'. The fitting 40' is shown to traverse through an angle of substantially 90°, which is different than that of the above-described embodiment (FIG. 2B). The cavity 32' is generally designed to conform to the shape of the body 30'. However, the cavity 32' as shown in FIG. 3B also provides a reduces static head at the discharge nozzle 44 over the cavity 32 shown in FIG. 2B. The cavity 32, 32' may thus be designed in a configuration and, in conjunction with body 30', an orientation to provide a desired amount of static head for more effective dispensing of the liquid material through the discharge port 44. Depending on factors such as the type of liquid material expected to be dispensed from the cavity 32, 32', and taking into consideration characteristics of the liquid material such as specific weight and viscosity, it may be desirable to develop a specified amount of static head at the discharge nozzle 44 to assist in the discharge of such liquid material.

As with the above-described embodiment, the downrigger weight 18' may be formed of various materials and exhibit different sizes, weights, shapes and configurations.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A fishing apparatus comprising:
    a body defining a cavity therein;
    a first opening formed in an exterior surface of the body and in communication with the cavity;
    a nozzle removably coupled with the first opening and configured to convey a liquid material through an orifice thereof;
    a second opening formed in the body; and
    a stopping member removably and sealingly coupled with the second opening.

2. The fishing apparatus of claim 1, further comprising a wicking member partially disposed in the cavity and extending through the nozzle orifice.

3. The fishing apparatus of claim 2, wherein the body is formed of a material comprising lead.

4. The fishing apparatus of claim 3, wherein a portion of the body is configured to exhibit a substantially spherical shape.

5. The fishing apparatus of claim 3, wherein the body is configured to exhibit a substantially fish-like shape.

6. The fishing apparatus of claim 3, wherein the cavity is at least partially formed with a steel pipe.

7. The fishing apparatus of claim 3, further comprising a plurality of fastening members coupled to the body.

8. The fishing apparatus of claim 7, wherein the plurality of fastening members are configured as eye hooks.

9. The fishing apparatus of claim 2, wherein the wicking member is formed of a material comprising cotton.

10. The fishing apparatus of claim 1, wherein the nozzle comprises a carburetor jet.

11. The fishing apparatus of claim 10, wherein the carburetor jet is configured to be threadedly coupled with the first opening.

12. A fishing apparatus comprising:
   a body defining a cavity therein for holding an amount of liquid material;
   a first opening formed in an exterior surface of the body and in communication with the cavity; and
   a wicking member partially disposed within the cavity and extending through the first opening and partially externally located relative to the body.

13. The fishing apparatus of claim 12, wherein the first opening includes a nozzle removably coupled with the body and in communication with the cavity and wherein the wicking member extends through an orifice of the nozzle.

14. The fishing apparatus of claim 12, wherein the body is formed of a material comprising lead.

15. The fishing apparatus of claim 12, wherein the wicking member is formed of a material comprising cotton.

16. The fishing apparatus of claim 12, further comprising at least one fastening device coupled to the body.

17. A downrigger weight comprising:
   a body defining a cavity therein for holding an amount of liquid material;
   a first opening formed in an exterior surface of the body and in communication with the cavity;
   a nozzle removably coupled with the first opening and configured to convey a liquid material through an orifice thereof;
   a wicking member partially disposed in the cavity and extending through the nozzle;
   a second opening formed in the exterior surface of the body and in communication with the cavity;
   a stopping removably and sealingly coupled with the second opening; and
   a plurality of fastening members coupled with the body.

18. The downrigger weight of claim 17, wherein the body is formed of a material comprising lead, the wicking member is formed of a material comprising cotton and wherein at least one of the plurality of fastening members is configured as an eye hook.

19. The downrigger weight of claim 18, wherein the body is configured to exhibit a substantially fish-like shape.

20. A fishing apparatus comprising:
   a body defining a cavity therein;
   a first opening formed in an exterior surface of the body and in communication with the cavity;
   a nozzle removably coupled with the first opening and configured to convey a liquid material through an orifice thereof, wherein the nozzle comprises a carburetor jet.

* * * * *

UNITED STATES PATENT AND TRADEMARK OFFICE
CERTIFICATE OF CORRECTION

PATENT NO.    : 6,640,487 B2  
DATED         : November 4, 2003  
INVENTOR(S)   : John S. Angwin Page 1 of 2

It is certified that error appears in the above-identified patent and that said Letters Patent is hereby corrected as shown below:

<u>Title page,</u>
Item [57], ABSTRACT,
Line 1, change "scent releasing" to -- scent-releasing --

<u>Column 1,</u>
Line 5, change "APPLICATIONS" to -- APPLICATION --
Line 9, insert a comma after "2002"
Line 37, insert a comma after "5,018,296"
Line 38, change "scent releasing" to -- scent-releasing --
Line 48, insert a comma after "5,412,897"
Line 49, change "scent releasing" to -- scent-releasing --

<u>Column 2,</u>
Lines 6, 7 and 9, change "allowed" to -- allows --
Lines 19, 35 and 47, insert a comma after "invention"
Line 44, change "an" to -- and --
Line 61, change "are" (both occurrences) to -- is --
Line 67, after "apparatus" and before the period insert -- is provided --

<u>Column 3,</u>
Lines 8 and 19, change "scent releasing" to -- scent-releasing --
Line 27, change "extend" to -- extends --
Line 57, delete the comma after "22"

<u>Column 4,</u>
Line 7, before "thereby" delete "and"
Line 17, insert a comma after "activities"
Line 25, after "of" and before "material" insert -- a --
Line 42, before "cavity" delete "is" and after "32" insert -- is --
Line 48, insert a comma after "example"
Line 56, change "reducing type" to -- reducing-type --

UNITED STATES PATENT AND TRADEMARK OFFICE
CERTIFICATE OF CORRECTION

PATENT NO. : 6,640,487 B2
DATED : November 4, 2003
INVENTOR(S) : John S. Angwin

It is certified that error appears in the above-identified patent and that said Letters Patent is hereby corrected as shown below:

Column 5,
Line 4, insert a comma after "material"
Line 8, change "44" to -- 46 --
Line 39, change "are" to -- is --
Line 52, change "cap" to -- stopping member --
Lines 58 and 61, change "scent releasing" to -- scent-releasing --

Column 6,
Line 9, change "48" to -- 48' --
Line 26, change "reduces" to -- reduced --
Line 31, change "port" to -- nozzle --

Signed and Sealed this

Twenty-eighth Day of September, 2004

JON W. DUDAS
*Director of the United States Patent and Trademark Office*